US012456060B2

(12) United States Patent
Marvaniya et al.

(10) Patent No.: US 12,456,060 B2
(45) Date of Patent: Oct. 28, 2025

(54) DISCOVERING FARMING PRACTICES

(71) Applicant: International Business Machines Corporation, Armonk, NY (US)

(72) Inventors: Smitkumar Narotambhai Marvaniya, Bangalore (IN); Umamaheswari Devi, Bangalore (IN); Shantanu R. Godbole, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1053 days.

(21) Appl. No.: 16/950,266

(22) Filed: Nov. 17, 2020

(65) Prior Publication Data

US 2022/0156603 A1    May 19, 2022

(51) Int. Cl.
*G06N 5/04*      (2023.01)
*A01B 79/00*    (2006.01)
(Continued)

(52) U.S. Cl.
CPC ............ *G06N 5/04* (2013.01); *A01B 79/005* (2013.01); *G06F 18/214* (2023.01); *G06N 20/00* (2019.01);
(Continued)

(58) Field of Classification Search
CPC .......... G06N 20/20; G06N 5/04; G06N 20/00; G06F 18/214; G06T 2207/20081;
(Continued)

(56) References Cited

U.S. PATENT DOCUMENTS 9,953,241 B2 *  4/2018  Lobell ................. G06V 20/188
11,645,308 B2   5/2023  Marvaniya
(Continued)

FOREIGN PATENT DOCUMENTS

CN      102194127 B    11/2012
CN      102162844 B    12/2012
(Continued)

OTHER PUBLICATIONS

Bamler et al. (Bamler), "Ground image processing and representation method for e.g. collection of traffic data involves placing first and second focusing parameters in matrix to coordinate synthetic aperture radar (SAR) . . . ", published on Aug. 30, 2007, document ID: DE-102006009121A1, p. 9 (Year: 2007).*
(Continued)

*Primary Examiner* — Chau T Nguyen
(74) *Attorney, Agent, or Firm* — Steven M. Bouknight (57) ABSTRACT

One embodiment provides a method, including: training a machine-learning model to produce customized farming practices specific to a farm to increase crop yield; wherein the training includes obtaining, from remote sensed data, (i) information corresponding to a crop of each of a plurality of farms and (ii) information corresponding to farming practices of each of the plurality of farms; wherein the training further includes detecting, from the remote sensed data, geographical features and farming characteristics of each of the plurality of farms; wherein the machine-learning model identifies from relationships between (iii) crop information and farming practices and (iv) geographical features and farming characteristics; and discovering, for a specific farm in an identified geographical location, utilizing the trained machine-learning model, and from farm-specific remote-sensed data, farming practices.

20 Claims, 4 Drawing Sheets (51) Int. Cl.
G06F 18/214 (2023.01)
G06N 20/00 (2019.01)
G06T 7/70 (2017.01)
G06V 10/75 (2022.01)
G06V 20/10 (2022.01)

(52) U.S. Cl.
CPC ............. *G06T 7/70* (2017.01); *G06V 10/758* (2022.01); *G06V 20/188* (2022.01); *G06T 2207/20081* (2013.01); *G06T 2207/30188* (2013.01)

(58) Field of Classification Search
CPC ............ G06T 2207/30188; G06T 7/70; G06V 10/758; G06V 20/13; G06V 20/188; A01B 79/005
See application file for complete search history.

(56) References Cited

U.S. PATENT DOCUMENTS

| | | | |
|---|---|---|---|
| 2014/0035752 | A1 | 2/2014 | Johnson |
| 2017/0169523 | A1 | 6/2017 | Xu et al. |
| 2017/0228475 | A1* | 8/2017 | Aldor-Noiman ..... G06V 20/188 |
| 2018/0189564 | A1* | 7/2018 | Freitag ................. G06F 18/214 |
| 2018/0211156 | A1* | 7/2018 | Guan ..................... G06N 3/044 |
| 2018/0330247 | A1 | 11/2018 | Cohen |
| 2019/0050948 | A1* | 2/2019 | Perry ................... A01B 79/005 |
| 2019/0147094 | A1* | 5/2019 | Zhan .................. G06F 16/2474 707/718 |
| 2019/0150357 | A1* | 5/2019 | Wu ........................... G06T 7/73 |
| 2019/0179009 | A1 | 6/2019 | Klein et al. |
| 2019/0317243 | A1 | 10/2019 | Xiang et al. |
| 2020/0327603 | A1* | 10/2020 | Jiang ...................... G06N 20/20 |
| 2021/0010993 | A1* | 1/2021 | Shibata .................... G06N 5/04 |
| 2021/0109209 | A1* | 4/2021 | Li ....................... G01S 13/9027 |
| 2021/0136996 | A1* | 5/2021 | Ben-Ner ............. A01B 79/005 |
| 2022/0005055 | A1* | 1/2022 | Wang ..................... G06N 20/00 |

FOREIGN PATENT DOCUMENTS

| | | | | |
|---|---|---|---|---|
| CN | 106772362 | A | 5/2017 | |
| WO | WO2017053273 | A1 | 3/2017 | |
| WO | WO2018136785 | A1 | 7/2018 | |
| WO | WO-2020188114 | A1 * | 9/2020 | ....... G01N 33/56961 |
| WO | WO-2021067847 | A1 * | 4/2021 | |

OTHER PUBLICATIONS

Kumar et al., "Crop Selection Method to Maximize Crop Yield Rate using Machine Learning Technique", published in May 2015 by IEEE, pp. 8 (Year: 2015).*
Medar et al., "Crop Yield Prediction using Machine Learning Techniques", published in 2019 by IEEE, pp. 5 (Year: 2019).*
Bondre et al., "Prediction of Crop Yield and Fertilizer Recommendation using Machine Learning Algorithms", published online Sep. 2019 in International Journal of Engineering Applied Sciences and Technology, vol. 4, Issue 5, ISSN No. 2455-2143, pp. 6. (Year: 2019).*
Liu Chang-An et al., Research advances of SAR remote sensing for agriculture applications: A review, Journal of Integrative Agriculture, 2019, 20 pages, Elsevier Ltd.
Antonio Roberto Formaggio et al., "Radarsat backscattering from an agricultural scene", Pesq.agropec.bras., Brasilia, 2001, 8 pages, vol. 36, No. 5.
Taranis, "Taranis Unveils Enhanced Platform for Aerial Imagery Insights into Farming", Mar. 12, 2019, 4 pages, Copy available at: https://www.prnewswire.com/news-releases/taranis-unveils-enhanced-platform-for-aerial-imagery-insights-into-farming-300810781.html.
Sitokonstantinou et al., "Scalable Parcel-Based Crop Identification Scheme Using Sentinel-2 Data Time-Series for the Monitoring of the Common Agricultural Policy", Remote Sensing Article, MDPI, Published: Jun. 8, 2018, 21 pages.
EoPortal.org, "NISAR (NASA-ISRO Synthetic Aperture Radar)", Jun. 25, 2018, 35 pages.
European Space Agency, "Sentinel-1", accessed on Oct. 24, 23, 3 pages.
Fieuzal et al., Abstract for "Estimation of leaf area index and crop height of sunflowers using multi-temporal optical and SAR satellite data", pp. 2780-2809, Published online: Apr. 26, 2016, 3 pages.
Inglada et al., "Improved Early Crop Type Identification By Joint Use of High Temporal Resolution SAR and Optical Image Time Series", Remote Sensing Article, MDPI, Published: Apr. 26, 2016, 21 pages.
ITC, "ITC's Leaf Tobacco business is synonymous with being The Tobaccos", Agri Business, accessed on Oct. 24, 2023, 6 pages, https://www.itcportal.com/businesses/agri-business/agri-business-iltd.aspx.
PLANET.com, "Imaging the Earth Daily", Global monitoring, daily insight, accessed Oct. 24, 23, 6 pages.
Ruchi Verma, "Polarimetric Decomposition Based on General Characterisation of Scattering From Urban Areas and Multiple Component Scattering Model", Mar. 2012, Thesis submitted to the Faculty of Geo-Information Science and Earth Observation of the University of Twente in partial fulfilment of the requirements for the degree of Master of Science in Geo-information Science and Earth Observation, 84 pages.
Steele-Dunne et al., "Radar Remote Sensing of Agricultural Canopies: A Review", IEEE Journal of Selected Topics in Applied Earth Observations and Remote Sensing, vol. 10, No. 5, May 2017, pp. 2249-2273.
Trafton, "The future of agriculture is computerized Machine learning can reveal optimal growing conditions to maximize taste and other features.", MIT News, Apr. 3, 2019, 4 pages.
Zhou et al., "Applications of SAR Interferometry in Earth and Environmental Science Research", Sensors 2009, vol. 9, pp. 1876-1912.
Planet Analytic Imagery and Archive, Retrieved from: https://www.planet.com/products/satellite-imagery-of-earth/ , Apr. 7, 2025, 7 pages.
S1 Mission, Retrieved from: https://sentiwiki.copernicus.eu/web/s1-mission1, Feb. 26, 2024, 39 pages.

\* cited by examiner

DISCOVERING FARMING PRACTICES

BACKGROUND

Farmers grow and provide food products, for example, produce, grain, meat, eggs, dairy products, and the like. Farmers are continually attempting to increase crop quality and crop yield in order to maximize profit and provide the most food products as possible. This is particularly true as the amount of farm land decreases across the world. Thus, farmers employ many different farming practices that assist in increasing crop or food product quality and crop yield. For example, farmers may employ different farming practices which decrease crop disease or bug infestation. As another example, farmers employ farming practices that maximize the amount of crops that can be planted within a single area. Accordingly, farmers use information from many different sources in order to determine which farming practices should be implemented. However, not all farmers record farming practices, so it can be difficult to identify the root causes for the yield in their farms and recommend best farming practices to be employed in order to increase crop quality and/or yield.

BRIEF SUMMARY

In summary, one aspect of the invention provides a method, including: training a machine-learning model to produce customized farming practices specific to a farm to increase crop yield; wherein the training includes obtaining, from remote sensed data, (i) information corresponding to a crop of each of a plurality of farms and (ii) information corresponding to farming practices of each of the plurality of farms; wherein the training further includes detecting, from the remote sensed data, geographical features and farming characteristics of each of the plurality of farms; wherein the machine-learning model identifies from relationships between (iii) crop information and farming practices and (iv) geographical features and farming characteristics; and discovering, for a specific farm in an identified geographical location, utilizing the trained machine-learning model, and from farm-specific remote-sensed data, farming practices.

Another aspect of the invention provides an apparatus, including: at least one processor; and a computer readable storage medium having a computer readable program code embodied therewith and executable by the at least one processor; wherein the computer readable program code is configured to train a machine-learning model to farming practices specific to a farm to increase crop yield; wherein the training includes obtaining, from remote sensed data, (i) information corresponding to a crop of each of a plurality of farms and (ii) information corresponding to farming practices of each of the plurality of farms; wherein the training further includes detecting, from the remote sensed data, geographical features and farming characteristics of each of the plurality of farms; wherein the machine-learning model identifies from relationships between (iii) crop information and farming practices and (iv) geographical features and farming characteristics; and wherein the computer readable program code is configured to discover, for a specific farm in an identified geographical location, utilizing the trained machine-learning model, and from farm-specific remote-sensed data, farming practices.

An additional aspect of the invention provides a computer program product, including: a computer readable storage medium having computer readable program code embodied therewith, the computer readable program code executable by the processor; wherein the computer readable program code is configured to train a machine-learning model to produce customized farming practices specific to a farm to increase crop yield; wherein the training includes obtaining, from remote sensed data, (i) information corresponding to a crop of each of a plurality of farms and (ii) information corresponding to farming practices of each of the plurality of farms; wherein the training further includes detecting, from the remote sensed data, geographical features and farming characteristics of each of the plurality of farms; wherein the machine-learning model identifies from relationships between (iii) crop information and farming practices and (iv) geographical features and farming characteristics; and wherein the computer readable program code is configured to discover, for a specific farm in an identified geographical location, utilizing the trained machine-learning model, and from farm-specific remote-sensed data, farming practices.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The use of satellite imaging has become common practice when viewing a large area. Cameras with fluctuating resolution may capture images of the earth from space, which may then be utilized to view specific regions on of the earth. Satellite imaging may be used in identifying crops and can even be used to identify a health of a plant. For example, sources such as the normalized difference vegetation index (NDVI) may utilize remote-sensed data (e.g., satellite imaging, etc.) to assess crop health on farms around the world. Utilizing the NDVI may provide a user with a high-level understanding of whether a crop is growing well or poorly in a particular location. When utilizing remote-sensed data, a user is limited to the information obtained by the remote-sensed source. For example, while the satellite imaging is able to identify a health of a plant or crop, it does not identify possible reasons for why the crop may be unhealthy, the area may be barren, or why other issues may be present with the crop. Thus, while conventional techniques use remote-sensed data to identify crops, identify a health of a crop, estimate a number of crops in an area, or the like, the remote-sensed data is not analyzed to determine why a crop may or may not be doing well within a particular area.

Some conventional techniques have been developed for recommending farming practices to be implemented in a particular area or for a particular farm. However, in order to create these customized farming practices, the system must have knowledge of the current farming practices that have been employed through the lifecycle of a crop. Many farmers do not provide farming practices in a form that would allow the system to identify what the current farming practices are so that customized farming practices can be provided.

Accordingly, an embodiment provides a system and method for discovering farming practices utilizing a trained machine-learning model that is trained utilizing various information sources, for example, remote-sensed data. In other words, the system can automatically discover the current farming practices of a specific farm without requiring the farmer to provide this information. The discovered farming practices can then be used to correlate yield with the adopted farming practices and then recommend or create customized farming practices for improving yield. A machine-learning model may be trained to discover or identify farming practices of a specific farm. A machine-learning model is trained utilizing obtained information, for example, remote-sensed data, corresponding to a crop of a plurality of farms and information corresponding to farming practices of each of the farms. The model additionally detects, from remote-sensed data, geographical features and farming characteristics of each of the farms. Based upon the training, the model may learn to identify relationships between the crop information and farming practices, which may be identified via remote-sensed data, and geographical features and farming characteristics. In other words, a system may receive remote-sensed data associated with one or more farms present in a geographical area and may recognize relationships between the obtained remote sensed data and farming practices associated with farms in the geographical area.

Once the model is trained, the system may discover or identify farming practices of a specific farm where the farming practices are not already known by analyzing farm-specific remote-sensed data for the specific farm. In other words, the system may utilize the trained machine-learning model within the geographical location to discover farming practices of a specific farm. Both the discovered farming practices and the farming practices identified from the remote-sensed data and used to train the machine-learning model may include practices such as row-to-row spacing, plant-to-plant spacing, plant density, hilling activities, frequency of irrigation, de-weeding, row orientation, gap filling activities, or any other farming practices that can be identified from the remote-sensed data. The discovered farming practices can then be used to enable counterfactual query generation which can be used to perform constrained optimization that can recommend customized farming practices.

Such a system provides a technical improvement over current systems for discovering or identifying farming practices. The described system and method allows a system to utilize remote-sensed data to train a machine-learning model to discover farming practices for a specific farm. Thus, instead of conventional techniques that rely on a farmer providing the farming practices in order to provide customized farming practices, the described technique can utilize remote-sensed data to discover the farming practices automatically, thereby creating a system that can be utilized for any farm regardless of whether the system already has farming practices of the farm. These discovered farming practices can then be utilized to generate customized farming practices.

Figure 1:
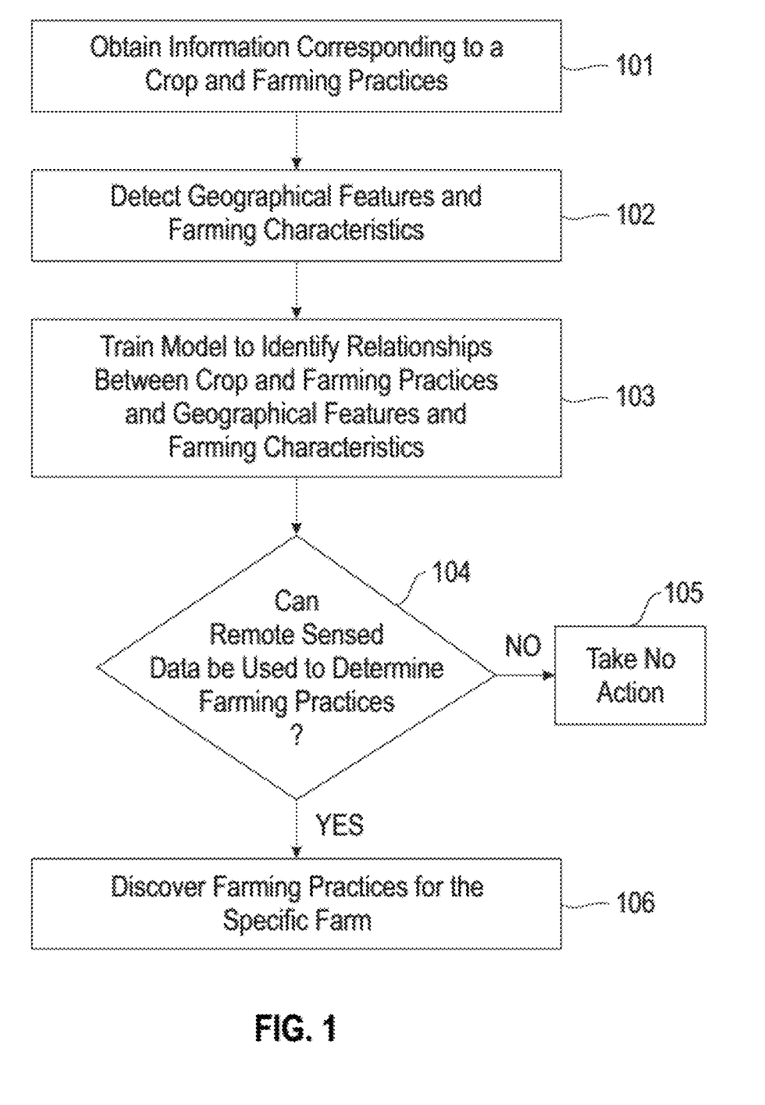
FIG. 1 illustrates a method of discovering farming practices utilizing a trained machine-learning model that is trained utilizing various information sources.

FIG. 1 illustrates a method for discovering farming practices utilizing a trained machine-learning model that is trained utilizing various information sources. The model is trained to recognize relationships between remote-sensed data and farming practices, which can then be used by the system to discover farming practices for a specific farm. To train the machine-learning model the system obtains information corresponding to a crop of each of a plurality of farms and information corresponding to farming practices of the farms at 101. The information corresponding to a crop of each of the plurality of farms may include the type of crop grown on the farm, a yield of the crop grown on the farm, and the like. The information corresponding to the farming practices of the farm may include information related to row-to-row spacing, plant-to-plant spacing, plant density, hilling activities, frequency of irrigation, de-weeding, row orientation, gap filling activities, terracing activities, a combination thereof, or the like.

To obtain the information corresponding to the crops and/or the information corresponding to the farming practices, the system may utilize remote-sensed data. Remote-sensed data is data which is received from a location other than directly from the farm. In other words, the remote-sensed data is data that is obtained from a source remote from the farm. Examples of remote-sensed data source include satellite imagery, drone imagery, and the like. The system may obtain the remote-sensed data at a regional analytics optimizer.

The remote-sensed data may be obtained using active remote sensing. Active remote sensing utilizes components of radar backscattering, which means that radiation is directed towards a target to supply information regarding the target back to a receiver. The remote-sensed data may be alternatively or additionally obtained using passive remote sensing. Passive remote sensing utilizes reflectance of various bands in the visible and near-infrared spectra to derive vegetation indices, which may describe crop and forest data. Further, passive remote sensing uses an external, natural energy source to reflect energy of a target and that may supply information back to a receiver.

The system may analyze the remote-sensed data to identify the crop information and/or farming practices information. One technique for analyzing the remote-sensed data is utilizing synthetic aperture radar (SAR) analytics. Synthetic aperture radar analytics may use a SAR backscatter technique, which is a combination of analysis of reflection from ground soil, double bounce from elongated elements, such as a stem or a trunk, scattering from crop canopies, and the like. From the reflections the system can identify ground or soil areas lacking crop growth, or gaps, within farm. The analysis may also identify vegetation based upon identifying double bounce from elongated elements, which would indicate stems, trunks, or the like. Similarly, the scattering backscatter from the crop canopy may indicate the presence of vegetation. Synthetic aperture radar backscattering techniques may identify ground structure and roughness, the structural intensity of a farm or region, the dielectric constant of the materials present on a farm, and the like. Since the SAR backscatter techniques are based on the use of reflection of microwave signals directed to the farms, the crop information and farming practices can be determined from the analysis of the reflections.

To identify the information the system may additionally utilize indices. For example, the SAR information may be used in conjunction with the Normalized Difference Vegetation Index (NDVI) which identifies different information about plants based upon reflections. The SAR information could be compared to the NDVI information to identify information about the crops. The system may also utilize additional information to identify crop information and/or farming practices, for example, weather data. For example, the system may utilize historical data to identify this information. As an example, historical data may be used to identify historical crop yields, historical farming practices, and the like. The additional data may also include metadata or any other derivation of current data, remote-sensed data, or historical data. Techniques for identifying specific farming practices are discussed in more detail below with respect to FIGS. 2 and 3.

Training the machine-learning model may also include detecting geographical features and farming characteristics of each of the plurality of farms. Geographical features may include geographical location, terrain features, water sources, and the like. Farming characteristics may include characteristics unique to a particular farm, for example, a size of the farming area, location of the farm with respect to other farms, percentage of shaded area on the farm, and the like. In other words, the geographical features and farming characteristics are those features and/or characteristics that may affect a crop yield or crop quality other than the farming practices information or crop information.

Detecting geographical features and/or farming characteristics may be accomplished using some of the same techniques as obtaining the farming practices information or crop information, for example, using the SAR analysis and analyzing the backscatter signals. The SAR backscattered signals may be used to produce one or more matrices, for example, a scattering matrix, a coherence matrix, a covariance matrix, or the like. Polarimetric decompositions are mechanisms that can express one or more of these matrices as a weighted combination for simpler scattering mechanisms, for example, surface scattering, double bounce, volume scattering, or the like.

Once the machine-learning model is trained, the trained model is able to identify relationships between the crop information and farming practices and the geographical features and farming characteristics, collectively referred to as training data. In other words, the trained machine-learning model is able to identify any correlations between any of the crop information and/or farming practices and any of the geographical features and/or farming characteristics. To identify these relationships, the machine-learning model may cluster the information included in the training data. Clustering may include identifying similarities in information and clustering the data having similarities or a detected correlation. Thus, the trained model can identify relationships between remote-sensed data and farming practices that allows the system to receive new remote-sensed data and identify farming practices solely from the remote-sensed data. In other words, the machine-learning model can be utilized on remote-sensed data for a specific farm to discover farming practices of that farm.

Accordingly, at 104, the system can determine whether farming practices can be discovered based upon the remote-sensed data and any additional information obtained. To make this determination the system can apply the trained model to a specific farm in an identified geographical location. If farming practices cannot be discovered, the system may take no action at 105. If, on the other hand, farming practices can be discovered, the system may discover the farming practices for a specific farm at 106. These are discussed in more detail in connection with FIG. 3.

Figure 2:
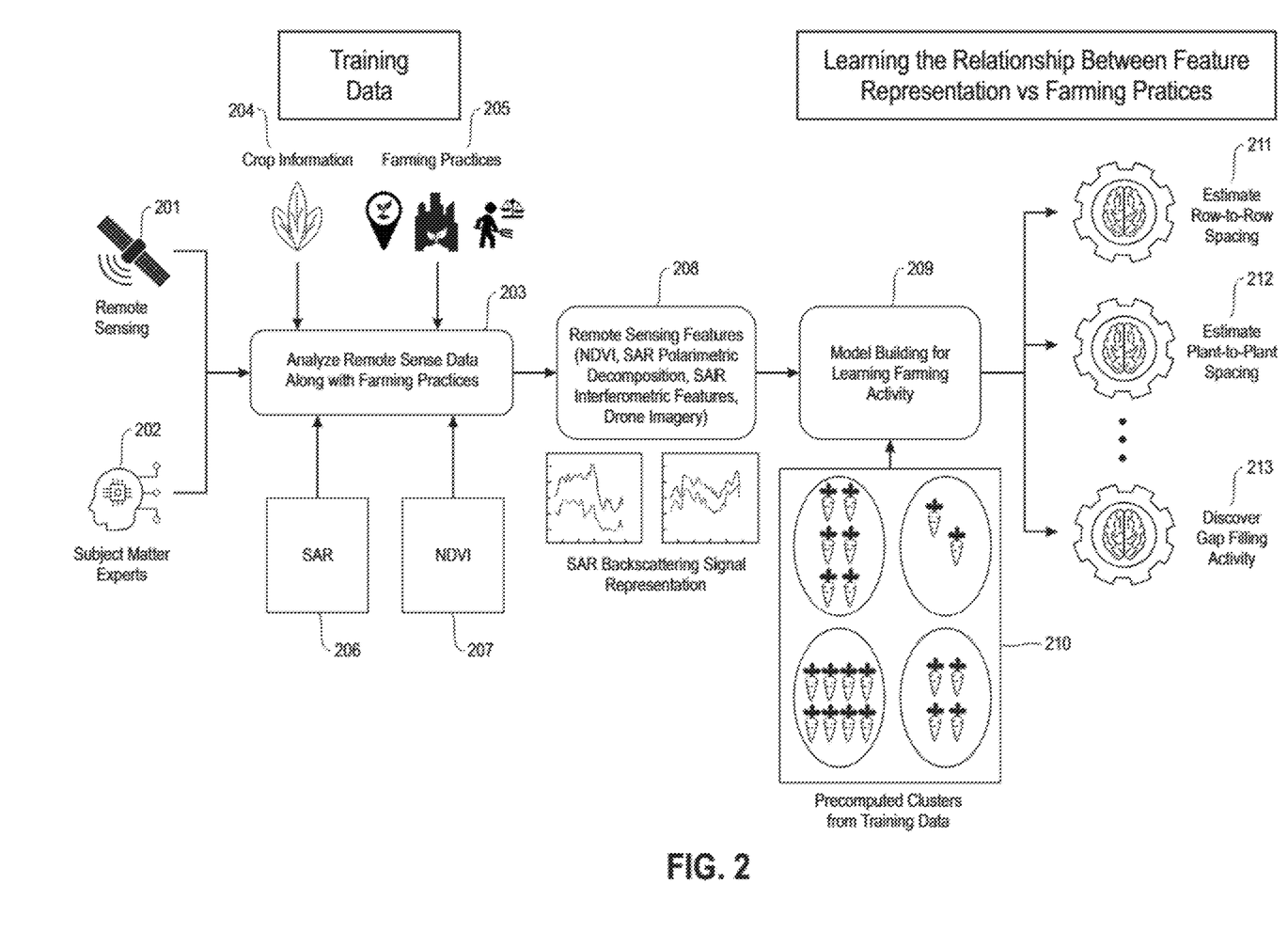
FIG. 2 illustrates an example system architecture for training a farming practices machine-learning model.

FIG. 2 illustrates a system architecture for training the machine-learning model and learning relationships between feature representations and farming practices. In training the machine-learning model, the machine-learning model may receive training data such as remote-sensed data 201 and information from subject matter experts 202. The machine-learning model may also receive additional training data such as crop information 204 and farming practices 205. The training data corresponds to a plurality of farms across a variety of geographical regions and locations. The machine-learning model can then analyze the remote sensing data with the farming practices at 203. When analyzing remote-sensed data along with the farming practices at 203 the system may also obtain remote-sensed data provided from SAR 206 and NDVI 207.

Based upon the analyzing 203, a system may identify remote-sensed features 208 of each of the farms. As discussed above, matrices may be produced from the remote-sensed data. The remote sensing features may then be utilized to train and build the model for learning farming activity 209. In building the model, the system may utilize clusters precomputed from the training data 210. These clusters represent features having similarities or having similar results. The model then learns relationships between represented features and farming practices, for example, row-to-row spacing 211, plant-to-plant spacing 212, gap filling activities 213, and the like.

An example technique for detecting gaps and, therefore, gap filling, is as follows. A system may utilize SAR backscattering in order to detect gaps present on a farm. For example, the system can receive SAR images and detect gaps within the images. When analyzing an image provided of a farm field, the system may recognize fixed spacing ratios for plant-to-plant spacing and row-to-row spacing. Based upon the recognition of these spacings, the detection of gaps within the field may be easily measured utilizing SAR backscattering data and weather data. The polarimetric decompositions of the composite signals received may assist in identifying the area missing crops. In an embodiment, since the use of remote sensed data and selected imagery may be utilized, outlier pixels with high surface scattering in comparison to the average of the pixels of the farm may be identified as gaps on the farm.

When detecting gaps, in an embodiment, a system may first identify the region of interest. Remote sensed data and weather data may then be obtained and used for detecting gaps. The system may cluster the pixels in a region associated with the imagery received from the remote sensed data, and separate the pixels of the region into the SAR backscattering components, or the correct polarimetric decomposition mechanism. These include surface scattering, volume scattering and double bounce. A comparison of clusters to the obtained remote sensed data and weather data may then assist in identifying the gaps present on the farm. The gaps are detected by comparing the magnitudes of the three components of the clusters. Volume scattering and recognition of volume dips in the scattering may indicate gaps on the farm. In an embodiment, weather data may be used to reconcile the high differences in the backscatter values. Dips in volume scattering may be present in comparison to past seasons because rain during the season, and the like. Thus, analysis of the SAR surface scattering may be impacted by weather, particularly rain, because the SAR signal can be reflected away and not returned to the receiver due to the presence of water on the canopy. Pixels of regions where gaps are present may have a decrease in NDVI and SAR volume scattering and an increase in surface scattering as compared to the non-gap locations. In an embodiment, time series analysis of the NDVI and SCAR volume scattering may be used to detect the extent of the gapping.

Thus, gap detection may be accomplished by obtaining remote images of a farm and performing a pixel to pixel comparison to identify crop locations. Using a pixel to pixel comparison may permit the detection of vegetation on a farm with high probability. Accordingly, areas without vegetation may be identified as gaps. As a non-limiting example, within an image having a pixel corresponding to 1 m, a gap of at least 2 plants may be detected. If the pixel size is increased, for example, to 5 m, a gap of at least 40-50 plants can be detected with high probability. Thus, as the pixel size increases, the gap in the larger pixel should be proportionally larger. A similar image analysis technique can also be utilized in determining row-to-row spacing and plant-to-plant spacing. In the row-to-row spacing and plant-to-plant spacing determination the system may cluster crops together, for example, in rows, cluster groups, or the like. The system can then derive measurements and identify a proximity of clusters to other clusters to identify a row spacing, plant spacing, or the like.

Additionally, when detecting row orientation from the remote sensed data, a system may continue to use SAR backscattering methods to determine such farm-crop-row orientation. Typically, row orientation for a farm runs north to south. Thus, in this typical farm implementation, due to this north to south orientation, not all field pixels considered from east to west have an equal number of rows. The unequal amount of rows may lead to different magnitudes of the scattering components from the pixels along different columns. Using the typical farm implementation, pixels in a row in the north to south direction will have more or less equal scattering components. In an embodiment, the pixels running in the east to west direction may have varying scattering components with certain periodicity. The scattering may be varying, but it does have a noticeable pattern. By tracing pixels associated with standard row and column orientation, a system may determine the row orientation by analyzing the SAR backscattering data. The reflective index between each row may be noticeable, similar to the detection of gaps.

As a system is trained, estimations for row-to-row spacing may be utilized for comparison to additional or farm-specific remote sensed data obtained for a farm. In an embodiment, estimating row-to-row spacing may include first obtaining specific location information (e.g., latitude and longitudinal coordinates, GPS positions, etc.). The system may extract the boundary field associated with the farm at the obtained location, and may further identify a region of interest within the farm. A system may then perform clustering of remote sensed data over a time series to determine the spacing and other variables from the SAR component spacing, or other remote-sensed data, provided. The clusters of the identified region of interest are then compared to precomputed clusters that were used as training data to select the closest cluster containing a similar row orientation. Based upon the similarity between the precomputed cluster and the obtained cluster for the region of interest, the system can estimate the row-to-row spacing. Such estimations may be stored and used in the future and may also be used to update and/or retrain the machine-learning model to make it more accurate.

Another farming practice that can be identified and/or discovered is a hilling activity. Hilling is the moving of earth or soil to protect plants from wind, roots breaking, root lodging, and the like. This practice compacts earth so that it can be used as a support system for a plant. Thus, hilling leads to a land uplift in pixels within remote-sensed data. The practice of hilling results in more land being visible, which increases the surface scattering as compared to non-hilled soils or surfaces. Thus, any land deformation such as land subsidence or uplift leads to a change of phase for the received radar signal. The land deformation can be detected utilizing SAR interferometry that uses phase difference in SAR images captured at a given location to study surface changes to the resolution of 5 mm. By monitoring interferograms constructed over a period of time, hilling activity can be detected.

Figure 3:
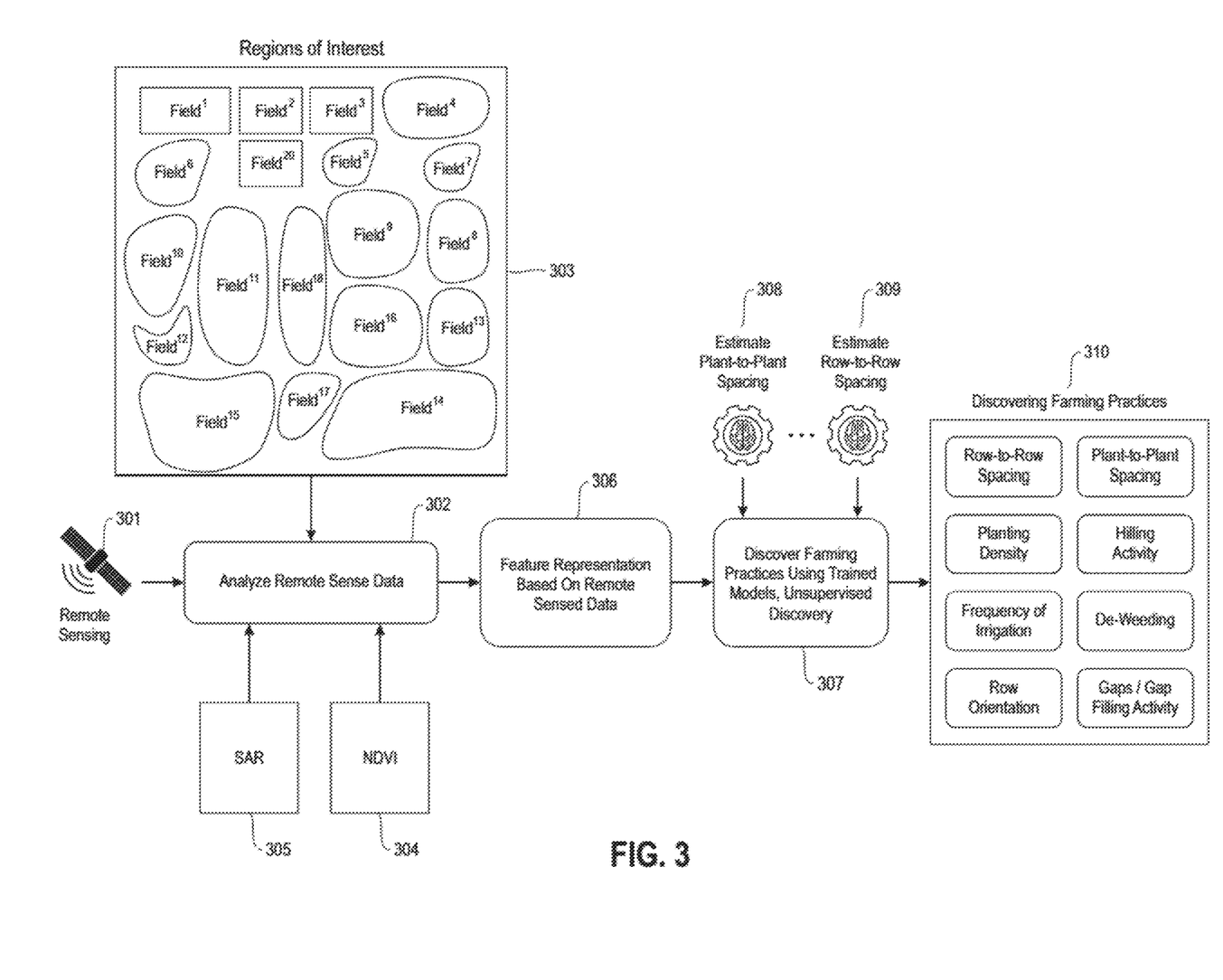
FIG. 3 illustrates an example system architecture for discovering or producing customized farming practices.

FIG. 3 illustrates an example system architecture for discovering farming practices, specifically, discovering customized farming practices. Since the model has already been trained, the remote-sensed data 301 captured and analyzed 302 in FIG. 3 is for a specific farm in a predetermined geographical location. This information is then used to produce the customized farming practices rather than training the model. However, it should be noted that the information may additionally be fed back into the model as additional training data, thereby allowing the machine-learning model to become more accurate over time. As with training the model, the remote-sensed data may be used in conjunction with the SAR 305 and NDVI 304 information. Additionally, since this information is for a specific farm, the geographical regions of interest 303 are identified.

Like in FIG. 2, after the analyzing the remote-sensed data 302 with the respect to the region of interest 303, feature representations based on the remote-sensed data 306 may be created. The feature representations represent the different features, characteristics, and information related to the farm, crops of the farm, geographical features, and the like. The feature representations can then be used to discover farming practices 307. Specifically, the feature representations can be provided to the trained model which will then identify current farming practices of the farm, for example, plant-to-plant spacing 308, row-to-row spacing 309, gap filling, terracing techniques, and the like, to identify improvements to those farming practices. In other words, the trained model ingests the current information regarding farming practices of the farm and then provides recommendations on changes to those farming practices, referred to as discovering farming practices 310. Discovering the farming practices may occur using similar techniques as those used to train the machine-learning model, as described in connection with FIG. 2.

Figure 4:
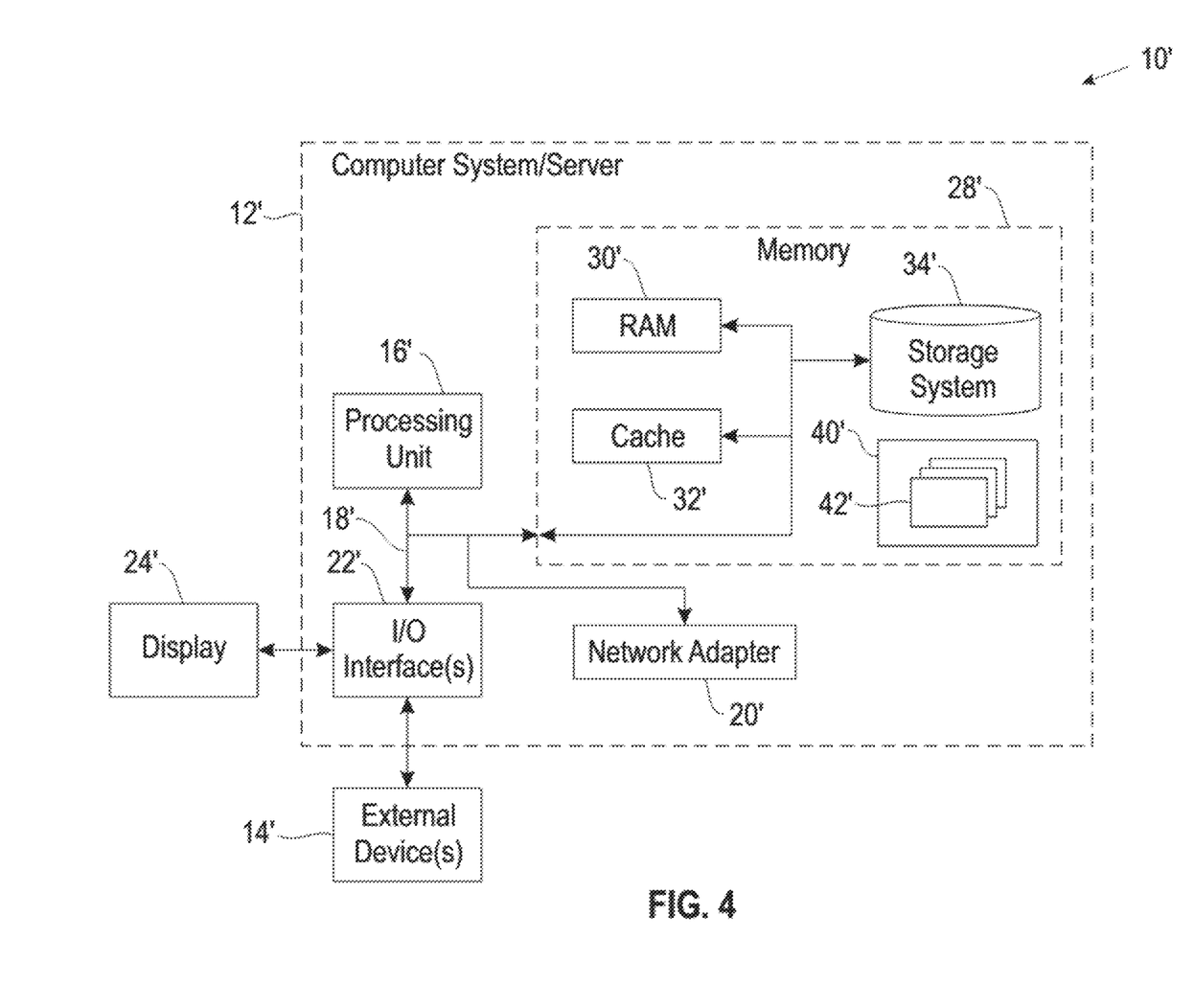
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer implemented method, comprising:
   training a machine-learning model to produce customized farming practices specific to a farm to increase crop yield;
   wherein the training comprises obtaining, from remote sensed data, (i) information corresponding to a crop of each of a plurality of farms and (ii) information corresponding to farming practices of each of the plurality of farms, wherein the farming practices further comprises different farming techniques;

wherein the training further comprises detecting, from the remote sensed data, geographical features and farming characteristics of each of the plurality of farms;

wherein the machine-learning model identifies relationships between (iii) the obtained crop information and farming practices information and (iv) the detected geographical features and farming characteristics;

automatically discovering, for a specific farm in an identified geographical location, utilizing the trained machine-learning model, and from farm-specific remote-sensed data including the farming characteristics, current farming practices; and based on the discovered current farming practices, determining, utilizing the trained machine-learning model, the customized farming practices including changes and improvements to the discovered current farming practices, wherein determining the customized farming practices further comprises correlating the crop yield with the discovered current farming practices, and recommending the customized farming practices for improving the crop yield.

2. The computer implemented method of claim 1, wherein the remote-sensed data comprises at least one of active remote sensing and passive remote sensing.

3. The computer implemented method of claim 1, wherein the obtaining from the remote sensed data, information corresponding to farming practices comprises obtaining metadata identifying historical crop data.

4. The computer implemented method of claim 1, wherein the detecting, from the remote sensed data, geographical features and farming characteristics comprises analyzing synthetic aperture radar for backscatter signals, wherein the backscatter signals provide an indication of the geographical features and farming characteristics.

5. The computer implemented method of claim 4, wherein the geographical features and farming characteristics are indicated via the backscatter signals by constructing at least one of: a scattering matrix, a coherence matrix, and a covariance matrix.

6. The computer implemented method of claim 1, wherein the identifying relationships comprises clustering the obtained crop information and farming practices and the detected geographical features and farming characteristics.

7. The computer implemented method of claim 1, wherein the farm-specific remote-sensed data comprises remote images of the specific farm and wherein the discovering comprises performing a pixel to pixel comparison on the remote images to identify crop locations on the specific farm.

8. The computer implemented method of claim 1, wherein the discovering comprises clustering rows of crops identified from the farm-specific remote-sensed data and identifying a proximity of clusters to identify row spacing on the specific farm.

9. The computer implemented method of claim 1, wherein the farm-specific remote-sensed data comprises synthetic aperture radar images and wherein the discovering comprises detecting, utilizing synthetic aperture radar interferometry on the synthetic aperture radar images, surface changes to identify hilling activity on the specific farm.

10. The computer implemented method of claim 1, wherein the farming practices comprises at least one of: row-to-row spacing, plant-to-plant spacing, plant density, hilling activity, frequency of irrigation, de-weeding, row orientation, and gap filling activity.

11. An apparatus, comprising:

at least one processor; and a computer readable storage medium having a computer readable program code embodied therewith and executable by the at least one processor;

wherein the computer readable program code is configured to train a machine-learning model to produce customized farming practices specific to a farm to increase crop yield;

wherein the training comprises obtaining, from remote sensed data, (i) information corresponding to a crop of each of a plurality of farms and (ii) information corresponding to farming practices of each of the plurality of farms, wherein the farming practices further comprises different farming techniques;

wherein the training further comprises detecting, from the remote sensed data, geographical features and farming characteristics of each of the plurality of farms;

wherein the machine-learning model identifies relationships between (iii) the obtained crop information and farming practices information and (iv) the detected geographical features and farming characteristics;

automatically discovering, for a specific farm in an identified geographical location, utilizing the trained machine-learning model, and from farm-specific remote-sensed data including the farming characteristics, current farming practices; and based on the discovered current farming practices, determining, utilizing the trained machine-learning model, the customized farming practices including changes and improvements to the discovered current farming practices, wherein determining the customized farming practices further comprises correlating the crop yield with the discovered current farming practices, and recommending the customized farming practices for improving the crop yield.

12. A computer program product, comprising:

a computer readable storage medium having computer readable program code embodied therewith, the computer readable program code executable by the processor;

wherein the computer readable program code is configured to train a machine-learning model to produce customized farming practices specific to a farm to increase crop yield;

wherein the training comprises obtaining, from remote sensed data, (i) information corresponding to a crop of each of a plurality of farms and (ii) information corresponding to farming practices of each of the plurality of farms, wherein the farming practices further comprises different farming techniques;

wherein the training further comprises detecting, from the remote sensed data, geographical features and farming characteristics of each of the plurality of farms;

wherein the machine-learning model identifies relationships between (iii) the obtained crop information and farming practices information and (iv) the detected geographical features and farming characteristics;

automatically discovering, for a specific farm in an identified geographical location, utilizing the trained machine-learning model, and from farm-specific remote-sensed data including the farming characteristics, current farming practices; and based on the discovered current farming practices, determining, utilizing the trained machine-learning model, the customized farming practices including changes and improvements to the discovered current farming practices, wherein determining the customized farming practices further comprises correlating the crop yield with the discovered current farming practices, and recommending the customized farming practices for improving the crop yield.

13. The computer program product of claim 12, wherein the remote-sensed data comprises at least one of active remote sensing and passive remote sensing.

14. The computer program product of claim 12, wherein the obtaining from the remote sensed data, information corresponding to farming practices comprises obtaining metadata identifying historical crop data.

15. The computer program product of claim 12, wherein the detecting, from the remote sensed data, geographical features and farming characteristics comprises analyzing synthetic aperture radar for backscatter signals, wherein the backscatter signals provide an indication of the geographical features and farming characteristics.

16. The computer program product of claim 15, wherein the geographical features and farming characteristics are indicated via the backscatter signals by constructing at least one of: a scattering matrix, a coherence matrix, and a covariance matrix.

17. The computer program product of claim 12, wherein the identifying relationships comprises clustering the obtained crop information and farming practices and the detected geographical features and farming characteristics.

18. The computer program product of claim 12, wherein the farm-specific remote-sensed data comprises remote images of the specific farm and wherein the discovering comprises performing a pixel to pixel comparison on the remote images to identify crop locations on the specific farm.

19. The computer program product of claim 12, wherein the discovering comprises clustering rows of crops identified from the farm-specific remote-sensed data and identifying a proximity of clusters to identify row spacing on the specific farm.

20. The computer program product of claim 12, wherein the farm-specific remote-sensed data comprises synthetic aperture radar images and wherein the discovering comprises detecting, utilizing synthetic aperture radar interferometry on the synthetic aperture radar images, surface changes to identify hilling activity on the specific farm.

* * * * *